United States Patent
Ripp et al.

(10) Patent No.: US 9,502,002 B2
(45) Date of Patent: Nov. 22, 2016

(54) PROXIMITY-BASED DISPLAY SCALING

(71) Applicant: LENOVO (Singapore) PTE, LTD., New Tech Park (SG)

(72) Inventors: Michael William Stuart Ripp, Raleigh, NC (US); Christopher Miles Osborne, Cary, UT (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 303 days.

(21) Appl. No.: 14/226,664

(22) Filed: Mar. 26, 2014

(65) Prior Publication Data

US 2015/0279335 A1    Oct. 1, 2015

(51) Int. Cl.
| | |
|---|---|
| G06F 3/041 | (2006.01) |
| G09G 5/26 | (2006.01) |
| G09G 5/391 | (2006.01) |
| G06T 3/40 | (2006.01) |

(52) U.S. Cl.
CPC ............... *G09G 5/26* (2013.01); *G06F 3/041* (2013.01); *G06T 3/4007* (2013.01); *G09G 5/391* (2013.01); *G06T 2210/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,884,736 B1* | 11/2014 | Gravino | ................ | G05B 15/02 340/10.4 |
| 9,098,248 B2* | 8/2015 | Suzuki | ................... | G06F 1/1626 |
| 2008/0117173 A1* | 5/2008 | Roberts | ................... | G06F 3/021 345/169 |
| 2012/0268414 A1* | 10/2012 | Alameh | .............. | G06F 3/03545 345/174 |
| 2013/0106842 A1* | 5/2013 | Miyazawa | .............. | G06F 3/041 345/419 |
| 2013/0207905 A1* | 8/2013 | Hankins | ................. | G06F 3/041 345/173 |
| 2014/0118354 A1* | 5/2014 | Pais | ....................... | G09G 5/373 345/428 |
| 2014/0267091 A1* | 9/2014 | Kim | ....................... | G06F 1/1652 345/173 |
| 2014/0368456 A1* | 12/2014 | Sakai | .................... | G06T 3/0488 345/173 |
| 2015/0169093 A1* | 6/2015 | Nakao | ..................... | G06F 3/041 345/173 |
| 2015/0213786 A1* | 7/2015 | Mamajiwala | .......... | G09G 5/391 345/428 |

* cited by examiner

*Primary Examiner* — Van Chow
(74) *Attorney, Agent, or Firm* — Kunzler Law Group

(57) ABSTRACT

A method, apparatus, and program product are disclosed for receiving a proximity input indicator signal associated with an information handling device, the information handling device comprising a display, determining a proximity of a user to the information handling device based on the proximity input indicator signal, and modifying one or more display settings of the information handling device in response to the determined proximity.

20 Claims, 6 Drawing Sheets

PROXIMITY-BASED DISPLAY SCALING

BACKGROUND

Field

The subject matter disclosed herein relates to displays and more particularly relates to modifying display settings based on a user's proximity.

Description of the Related Art

In general, displays of information handling devices may include various display settings, such as resolution, brightness, contrast, etc. However, some settings that are appropriate for a particular use of an information handling device may not be appropriate for a different use. A user may be able to manually change display settings, but this can be tedious and frustrating if the user frequently switches between usage modes, such as converting a tablet computer to a laptop-type computer, and vice-versa. Thus, it may be beneficial to dynamically change the display settings of an information handling device based on a user's proximity to the information handling device.

BRIEF SUMMARY

An apparatus for proximity-based display scaling is disclosed. A method and computer program product also perform the functions of the apparatus. In one embodiment, an apparatus includes an information handling device that includes a display and a processor coupled to the information handling device. In another embodiment, an apparatus includes an input module that receives a proximity input indicator signal associated with the information handling device.

In another embodiment, an apparatus includes a proximity module that determines a proximity of a user to the information handling device based on the proximity input indicator signal. An apparatus, in certain embodiments, includes a settings module that modifies one or more display settings of the information handling device in response to the determined proximity.

In certain embodiments an input module further includes a mode module that receives a proximity input indicator signal from a mode detector. In one embodiment, a mode detector determines a usage mode of the information handing device. In another embodiment, a mode module receives a proximity input indicator signal in response to the mode detector detecting a detachable keyboard being coupled to the information handling device or uncoupled from the information handling device.

In a further embodiment, a proximity input indicator signal includes a docked mode signal in response to the information handling device being coupled to the detachable keyboard and a handheld mode signal in response to the information handling device being uncoupled from the detachable keyboard. In another embodiment, an input module further includes a sensor module that receives a proximity input indicator signal from a sensor operably coupled to the information handling device. In certain embodiments, a sensor includes a 3D camera, an infrared camera, and/or a proximity sensor.

In another embodiment, a settings module further includes a display module that adjusts a resolution of the display according to the determined proximity. In one embodiment, a settings module further includes a text module that adjusts the size of text presented on the display according to the determined proximity. In a further embodiment, a text module adjusts the size of text presented on the display without adjusting the size of other items presented on the display.

In some embodiments, an apparatus further includes a timing module that, in response to the determined proximity, starts a timer set for a predetermined period of time. In certain embodiments, a settings module adjusts the one or more display settings in response to expiration of a timer. In another embodiment, an apparatus includes a configuration module that sets one or more parameters associated with the display settings in response to user input.

A method is provided that, in one embodiment, includes receiving a proximity input indicator signal associated with an information handling device. In some embodiments, the information handling device includes a display. In another embodiment, a method includes determining, by use of a processor, a proximity of a user to the information handling device based on the proximity input indicator signal. In another embodiment, a method includes modifying one or more display settings of the information handling device in response to the determined proximity.

A method, in some embodiments, includes receiving a proximity input indicator signal from a mode detector, which may determine a usage mode of the information handing device. In a further embodiment, a proximity input indicator signal is received in response to a mode detector detecting a detachable keyboard being coupled to the information handling device or uncoupled from the information handling device. A method, in another embodiment, includes receiving a proximity input indicator signal from a sensor operably coupled to the information handling device.

In one embodiment, a method includes adjusting a resolution of the display according to the determined proximity. In another embodiment, a method includes adjusting the size of text presented on the display according to the determined proximity. In a further embodiment, the size of text presented on the display is adjusted without adjusting the size of other items presented on the display. A method, in one embodiment, includes starting a timer set for a predetermined period of time in response to the determined proximity. In some embodiments, one or more display settings are adjusted in response to expiration of the timer.

A computer program product is provided that, in one embodiment, includes a computer readable storage medium that stores code executable by a processor to perform operations. In one embodiment, operations include receiving a proximity input indicator signal associated with an information handling device. In one embodiment, the information handling device includes a display. In another embodiment, operations include determining a proximity of a user to the information handling device based on the proximity input indicator signal. In a further embodiment, operations include modifying one or more display settings of the information handling device in response to the determined proximity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
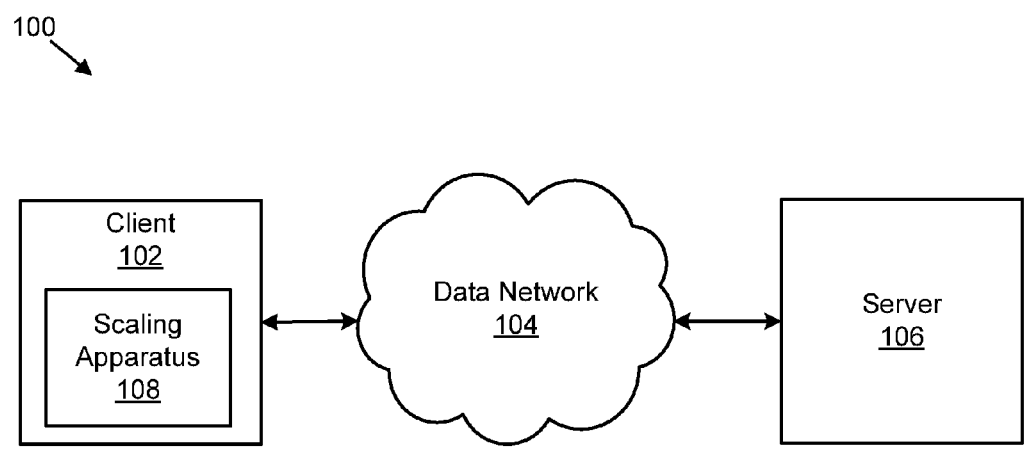
FIG. 1 is a schematic block diagram illustrating one embodiment of a system for proximity-based display scaling.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts one embodiment of a system 100 for proximity-based display scaling. In one embodiment, the system 100 includes clients 102, data networks 104, servers 106, and scaling apparatuses 108, which are described below in more detail.

The clients 102, in one embodiment, include a laptop computer, a desktop computer, a tablet computer, a smart phone, a smart TV, a smart watch, an optical head-mounted display, a smart TV, an eBook reader, and/or the like. In some embodiments, the clients 102 include a detachable keyboard. For example, a user may convert a tablet computer to a laptop computer by docking the tablet into a keyboard. Similarly, the user may convert the laptop computer to a tablet computer by detaching the tablet from the keyboard. In some embodiments, the detachable keyboard is attached to a client 102 using a physical connection, such as a USB connection, or the like. In another embodiment, the detachable keyboard communicates with a client 102 using a wireless connection, such as BlueTooth®, infrared radio, Wi-Fi, and/or the like.

In certain embodiments, a user converts the laptop computer into a tablet computer by folding the display substantially back on itself, such that the back side of the display is against the back side of the keyboard. In another embodiment, the clients 102 include one or more sensors configured to detect the presence of a user. For example, the clients may include three-dimensional ("3D") cameras, infrared cameras, proximity sensors, and/or the like.

In certain embodiments, the clients 102 include information handling devices 102 that include an electronic display. The electronic display, in certain embodiments, includes a cathode ray tube ("CRT") display, a liquid-crystal ("LCD") display, a light-emitting diode ("LED") display, an organic light-emitting diode ("OLED") display, a plasma display, and/or the like. The electronic display, in another embodiment, includes a configurable display resolution, which may be defined as width×height, with the units in pixels. In some embodiments, the display resolution includes various resolution ratios, such as standard-definition ("SD"), high-definition ("HD" or "HD+"), wide extended graphics array ("WXGA" or "WXGA+"), full high-definition ("FHD"), wide quad high-definition ("WQHD"), and/or the like. In general, items presented on the electronic display become larger as the resolution decreases and become smaller as the resolution increases.

The data networks 104, in one embodiment, comprise a digital communication network 104 that transmits digital communications. The digital communication network 104 may include a wireless network, such as a wireless telephone network, a local wireless network, such as a Wi-Fi network, a Bluetooth® network, and the like. The digital communication network 104 may include a wide area network ("WAN"), a storage area network ("SAN"), a local area network ("LAN"), an optical fiber network, the internet, or other digital communication network known in the art. The digital communication network 104 may include two or more networks. The digital communication network 104 may include one or more servers, routers, switches, and/or other networking equipment. The digital communication network 104 may also include computer readable storage media, such as a hard disk drive, an optical drive, non-volatile memory, random access memory ("RAM"), or the like.

In certain embodiments, the servers 106 include a mainframe computer, a desktop computer, a laptop computer, a cloud server, and/or the like. In one embodiment, the clients 102 are communicatively coupled to the servers 106 through the data network 104. In another embodiment, the clients 102 access data stored on the server 106 through the data network 104.

The scaling apparatus 108, in one embodiment, is configured to receive a proximity input indicator signal associated with an information handling device 102. In another embodiment, the scaling apparatus 108 determines a proximity of a user to the information handling device 102 based on the proximity input indicator signal. In a further embodiment, the scaling apparatus 108 modifies one or more display settings of the information handling device 102 in response to the determined proximity. In some embodiments, the scaling apparatus 108 includes one or more modules that perform the operations of the apparatus 108. The scaling apparatus 108, including its accompanying modules, are discussed in more detail below.

Figure 2:
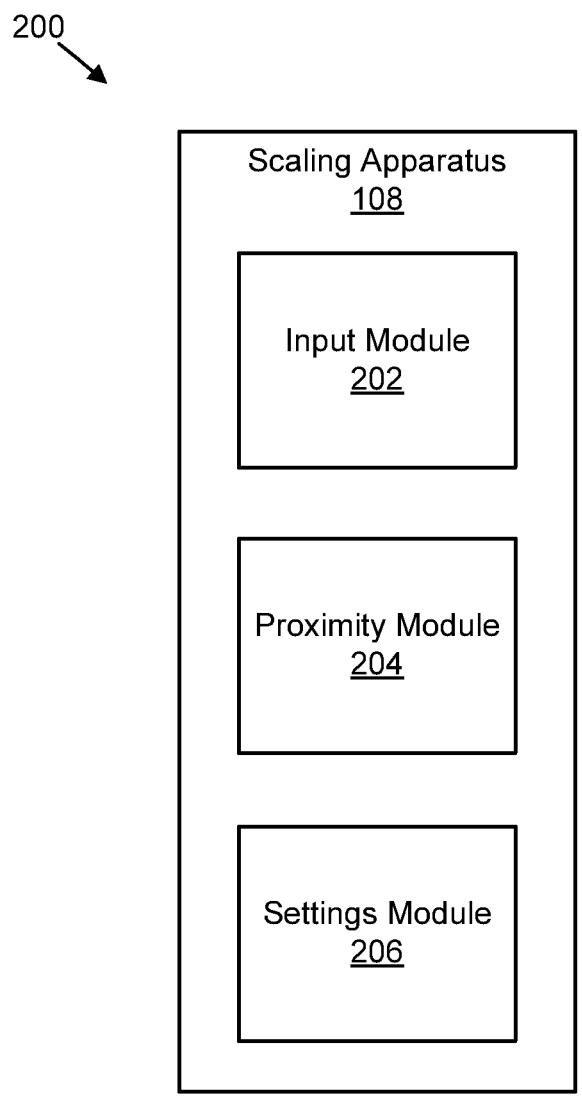
FIG. 2 is a schematic block diagram illustrating one embodiment of an apparatus for proximity-based display scaling.

FIG. 2 depicts one embodiment of an apparatus 200 for proximity-based display scaling. In one embodiment, the apparatus 200 includes an embodiment of a scaling apparatus 108. The scaling apparatus 108, in certain embodiments, includes an input module 202, a proximity module 204, and a settings module 206, which are described in more detail below.

The input module 202, in one embodiment, receives a proximity input indicator signal associated with an information handling device 102. In certain embodiments, the input module 202 determines a user's presence in relation to the information handling device 102 based on the proximity input indicator signal. For example, the input module 202 may determine how close a user is to the information handling device 102 based on the proximity input indicator signal.

The proximity input indicator signal, in some embodiments, is generated based on a physical interaction with the information handling device 102. For example, the input module 202 may receive a proximity input indicator signal in response to a user docking the information handling device 102 into a keyboard or otherwise physically interacting with the information handling device 102. Alternatively, the proximity input indicator signal may be based on detecting a user's presence without the user physically interacting with the information handling device 102. For example, a camera coupled to the information handling device 102 may detect the user's presence without the user interacting with the information handling device 102, which may generate a proximity input indicator signal. In another embodiment, a proximity input indicator signal may be generated in response to a wireless input device, such as a Bluetooth® keyboard, being coupled to the information handling device 102.

The proximity module 204, in one embodiment, determines a proximity of a user to an information handling device 102 based on the proximity input indicator signal received by the input module 202. For example, in response to a proximity input indicator signal being generated in response to a tablet computer being detached from an attachable keyboard, the proximity module 204 may determine that the user is within a close proximity to the information handling device 102 (e.g., the user is likely holding the information handling device 102 in his hands).

In some embodiments, the proximity module 204 uses a combination of proximity input indicator signals to determine the proximity of a user. For example, the proximity module 204 may determine that a user is within arm's length of the information handling device 102 in response to proximity input indicator signals generated by attaching a keyboard to the information handling device 102 and detecting a user's presence via a camera.

The settings module 206, in another embodiment, modifies one or more display settings of the information handling device 102 in response to the determined proximity. In one embodiment, the display settings modified by the settings module 206 include a display resolution, a text size, a font type, a display brightness, an icon size, and/or the like. Alternatively, the settings module 206 may modify other settings, such as microphone settings, audio settings, camera settings, and/or the like.

For example, the settings module 206 may change the scale of the display from 150% to 100% in response to a keyboard being detached from a tablet computer. In this example, the input module 202 may receive a proximity input indicator signal in response to a user uncoupling the tablet computer from the keyboard. The proximity module 204 may determine that the user is within a close proximity to the information handling device 102 based on the proximity input indicator signal. The settings module 206 may then modify one or more display settings based on the proximity determined by the proximity module 204 because the user is likely within a closer proximity to the tablet computer compared to when the tablet computer is coupled to the keyboard.

Figure 3:
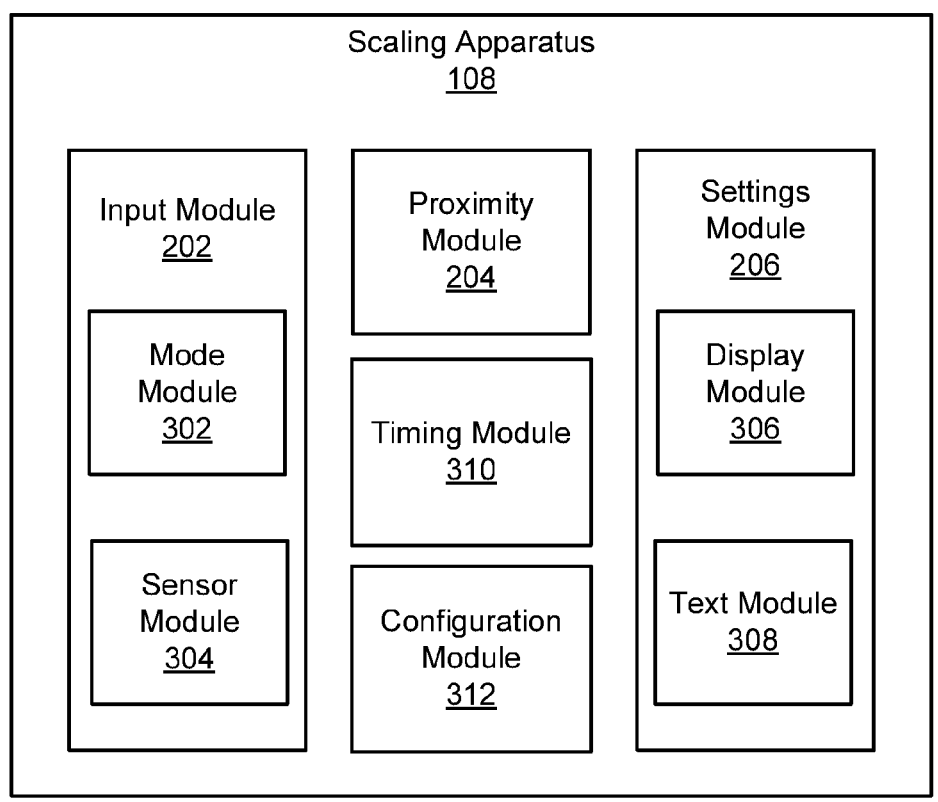
FIG. 3 is a schematic block diagram illustrating one embodiment of another apparatus for proximity-based display scaling.

FIG. 3 depicts one embodiment of another apparatus 300 for proximity-based display scaling. In one embodiment, the apparatus 300 includes an embodiment of a scaling apparatus 108. The scaling apparatus 108, in certain embodiments, includes an input module 202, a proximity module 204, and a settings module 206, which are substantially similar to the input module 202, the proximity module 204, and the settings module 206 described above with reference to FIG. 2.

In another embodiment, the scaling apparatus 108 includes a mode module 302, a sensor module 304, a display module 306, a text module 308, a timing module 310, and a configuration module 312, which are described in more detail below.

The mode module 302, in one embodiment, receives a proximity input indicator signal from a mode detector. In certain embodiments, the mode detector determines a usage mode of the information handling device 102. For example, the mode detector may detect a user is using a tablet computer in a handheld mode instead of a docked mode, such as when the tablet is coupled to a keyboard. In another embodiment, the usage mode includes a docked mode, a typing mode, a tablet mode, a touch mode, and/or the like.

In another embodiment, the mode module 302 receives a proximity input indicator signal in response to the mode detector detecting a detachable keyboard being coupled to the information handling device 102 and/or uncoupled from the information handling device 102. In such an embodiment, the proximity input indicator signal comprises a docked mode signal in response to the information handling device 102 being coupled to the detachable keyboard and a handheld mode signal in response to the information handling device 102 being uncoupled from the detachable keyboard. In response to the usage mode detected by the mode module 302, the settings module 206 may adjust one or more display settings of the information handling device 102.

The sensor module 304, in another embodiment, receives a proximity input indicator signal from a sensor operably coupled to the information handling device 102. The sensor, in certain embodiments, includes a 3D camera, an infrared camera, a proximity sensor, and/or the like. For example, the sensor module 304 may receive a proximity input indicator signal from a 3D camera, which can detect the proximity of the user to the information handling device 102. If a user is close to the information handling device 102, then the user is more likely to be within close proximity to the information handling device 102, and the settings module 206 can modify the display settings accordingly In certain embodiments, the mode module 302 and the sensor module 304 are used together to determine the proximity of a user to the information handling device 102. For example, the mode module 302 may determine that a tablet is coupled to a keyboard, which would be a docked mode, and the sensor module 304 may use a camera to determine the user is sitting two feet away from the tablet. Accordingly, the settings module 206 may adjust one or more display settings of the tablet based on the proximity information.

In another embodiment, the display module 306 adjusts a resolution of the display according to the determined proximity. In certain embodiments, the display module 306 adjusts the display resolution in order to make items presented on the display larger or smaller, depending on the determined proximity. For example, the display module 306 may reduce the display resolution of a tablet computer to make items appear larger on the display in response to the tablet computer being coupled to a keyboard. In such an embodiment, the display module 306 reduces the resolution because the user is likely to be at a further proximity from the tablet when it is docked.

The display module 306 determines, in certain embodiments, the types of content being presented on the display and adjusts a resolution of the display based on the types of content presented. For example, in some embodiments, if a video is being presented on the display of a tablet while in docked mode, the display module 306 may present the video in a higher resolution than other items presented on the display. Similarly, the display module 306 may present images or other multimedia content in a higher resolution than other items presented on the display.

In one embodiment, the display module 306 dynamically adjusts the display resolution according to the determined proximity. In another embodiment, the display module 306 prompts a user to confirm changing the resolution of the display in response to the input module 202 receiving a proximity input indicator signal.

In another embodiment, the text module 308 adjusts the size of text presented on the display according to the determined proximity. In certain embodiments, the text module 308 adjusts the size of text presented on the display without adjusting the size of other items presented on the display. For example, the text module 308 may adjust the text size of a website presented on the display without adjusting other items on the website, such as images, videos, and/or the like. Similarly, the text module 308 may adjust the size of text presented on the interface of an information handling device 102 without adjusting the size of icons, images, and/or the like that are also presented on the display.

In some embodiments, the display module 306 and the text module 308 perform independently of one another. In one embodiment, the display module 306 adjusts the resolution of the display and the text module 308 adjusts the size of text presented on the display regardless of how the display module 306 adjusted the display resolution. For example, the display module 306 may increase the resolution of the display, which would typically make the size of text presented on the display smaller. The text module 308, however, may compensate for the decrease in text size by increasing the size of text presented on the display at the same time.

In one embodiment, the timing module 310, in response to the determined proximity, starts a timer set for a predetermined period of time. In one embodiment, in response to expiration of the timer, the settings module 206 adjusts one or more display settings. In some embodiments, delaying the adjustment of the one or more display settings until a timer expires ensures that the display settings do not constantly change. For example, a user adjusting the position of tablet computer would probably not expect the resolution of the display to change while the position of the tablet computer is being adjusted. In such an embodiment, the input module 202 may receive a proximity input indicator signal in response to the user changing the tablet computer's position. In response to the received signal, the timer module 310 may start a timer such that the settings module 206 does not modify the display settings until the timer expires.

In another embodiment, the configuration module 312 sets one or more parameters associated with the display settings in response to user input. In certain embodiments, the parameters include a screen resolution, a text size, and/or the like. In some embodiments, the user-defined parameters are assigned to different usage modes. For example, the user may set the display scaling to 175% for a tablet computer in a docked mode (e.g., a tablet attached to a keyboard), and the display scaling to 100% in a handheld mode. Alternatively, for example, the user may assign a 1440×900 screen resolution to a tablet in docked mode and a 1920×1080 screen resolution to the tablet in handheld mode.

Figure 4:
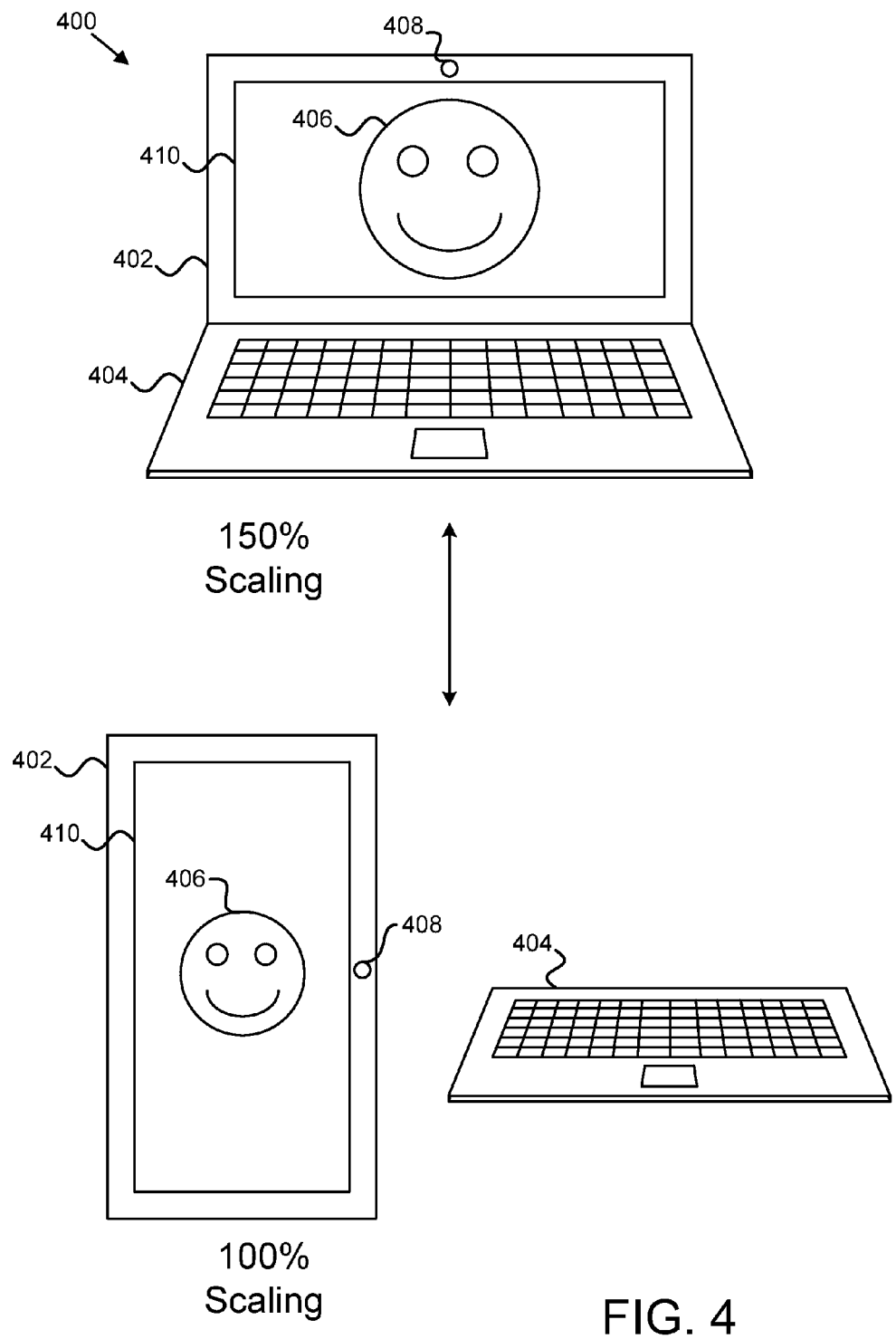
FIG. 4 is a schematic block diagram illustrating one embodiment of proximity-based display scaling.

FIG. 4 depicts one embodiment of a system 400 for proximity-based display scaling. In one embodiment, the system 400 includes an information handling device 402 that may be embodied as a tablet computer 402. In one embodiment, the tablet computer 402 includes a display 410 and a camera 408. In another embodiment, the system 400 includes a detachable keyboard 404.

In one embodiment, when the tablet computer 402 is docked to the detachable keyboard 404, the scaling is set to 150%, such that presented items 406 are larger than usual. As the tablet computer 402 is detached from the detachable keyboard 404, the input module 202 receives a proximity input indicator signal and a proximity module 204 determines a proximity of the user to the tablet 402 based on the proximity input indicator signal. In certain embodiments, a mode module 302 receives the proximity input indicator signal in response to the tablet 402 being detached from the keyboard 404.

In the depicted embodiment, the proximity input indicator signal may comprise a handheld mode signal that is generated in response to the tablet 402 being uncoupled from the keyboard 404. Thus, based on the handheld mode signal, the proximity module 204 may determine that the tablet 402 is within close proximity to the user. In certain embodiments, the proximity module 204 may determine a proximity based on a proximity input indicator signal received by a sensor module 304, which may use the camera 408 to determine the user's presence and/or proximity. Based on the determined proximity, the settings module 206 may adjust the scaling of the display to 100% such that the size of presented items 406 is reduced.

Figure 5:
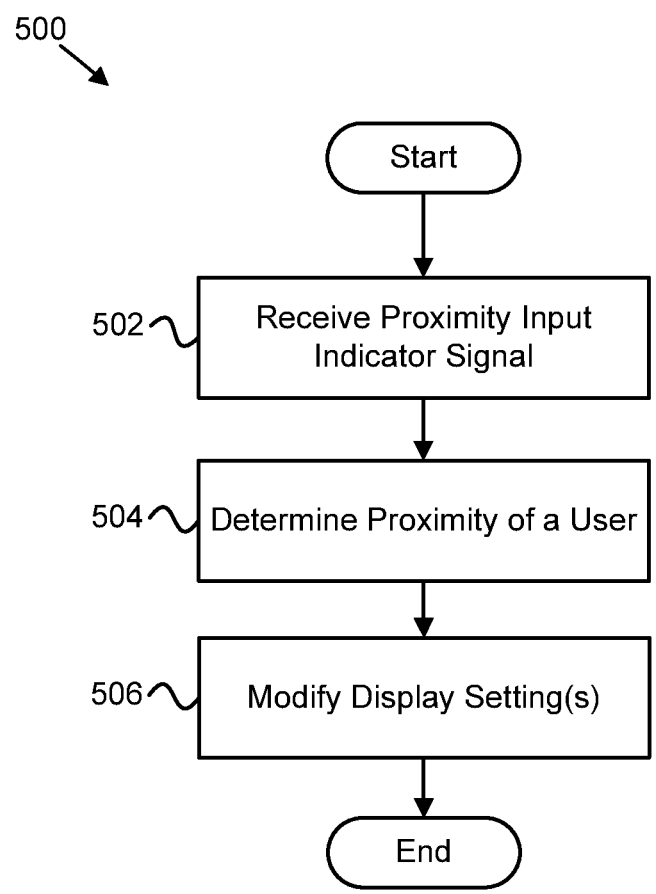
FIG. 5 is a schematic flow chart diagram illustrating one embodiment of a method for proximity-based display scaling.

FIG. 5 depicts one embodiment of a method 500 for proximity-based display scaling. In one embodiment, the method 500 begins and an input module 202 receives 502 a proximity input indicator signal associated with an information handling device 102. In another embodiment, a proximity module 204 determines 504 a proximity of a user to the information handling device 102 based on the proximity input indicator signal. In a further embodiment, a settings module 206 modifies 506 one or more display settings of the information handling device 102 in response to the determined proximity, and the method 500 ends.

Figure 6:
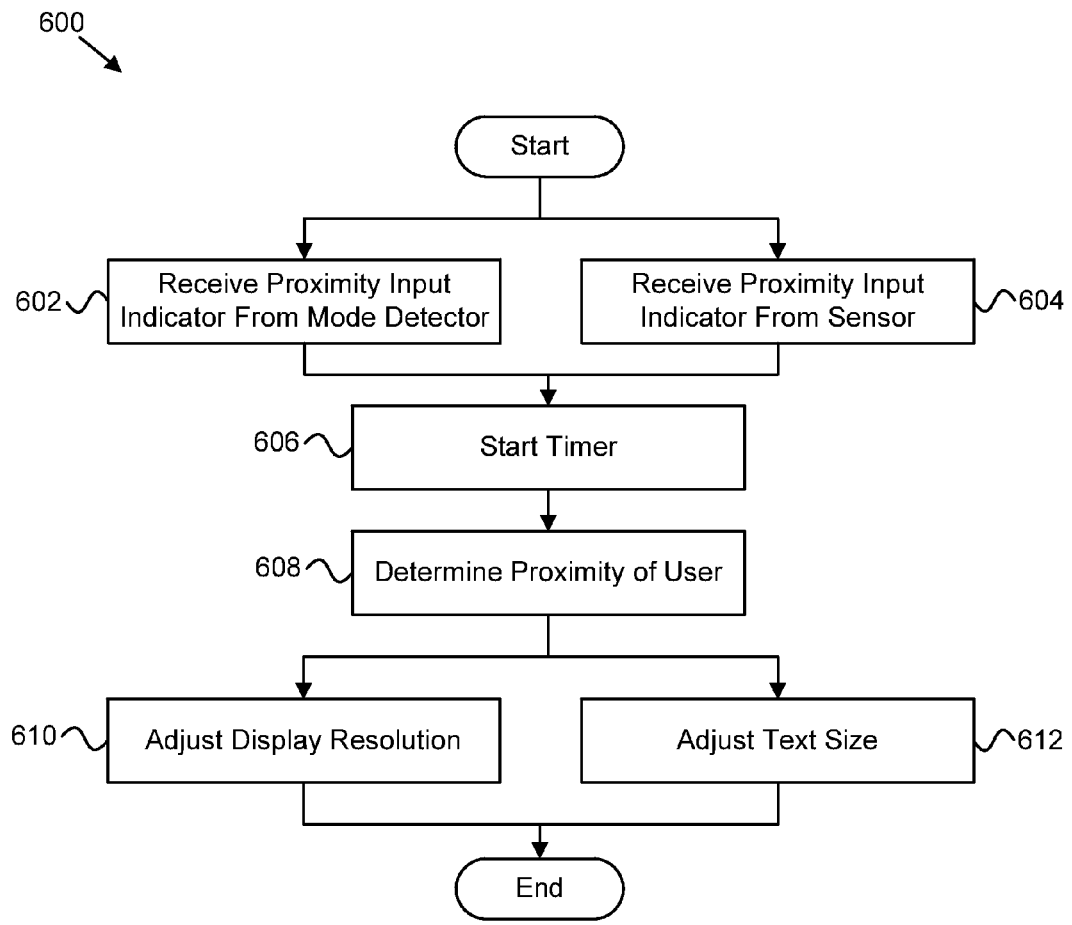
FIG. 6 is a schematic flow chart diagram illustrating one embodiment of another method for proximity-based display scaling.

FIG. 6 depicts one embodiment of another method 600 for proximity-based display scaling. In one embodiment, the method 600 begins and a mode module 302 receives 602 a proximity input indicator signal from a mode detector, which determines a usage mode of the information handling device 102. For example, the usage mode may include a docked mode for an information handling device 102 attached to a detachable keyboard and a handheld mode for an information handling device 102 is held in a user's hands.

In another embodiment, a sensor module 304 receives 604 a proximity input indicator signal from a sensor, such as a 3D camera, an infrared camera, a proximity sensor, and/or the like. In one embodiment, in response to receiving a proximity input indicator signal, a timing module 310 begins 606 a timer set for a predetermined period of time. In response to expiration of the time, in some embodiments, a proximity module 204 determines 608 the proximity of the user to the information handling device 102 based on the received proximity input indicator signal.

In response to determining 608 the proximity of the user to the information handling device 102, in certain embodiments, the settings module 206 adjusts 610 a resolution of the display of the information handling device 102. In another embodiment, the settings module 206 adjusts 612 the size of text presented on the display, and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
an information handling device comprising a display;
a processor operatively coupled to the information handling device;
an input module that receives a proximity input indicator signal associated with the information handling device in response to detecting that a usage mode of the information handling device changes between a laptop mode and a tablet mode;
a proximity module that determines a proximity of a user to the information handling device in response to the received proximity input indicator signal; and
a settings module that modifies one or more display settings of the information handling device based on the determined proximity.

2. The apparatus of claim 1, wherein the input module further comprises a mode module that receives a proximity input indicator signal from a mode detector, the mode detector determining a usage mode of the information handling device.

3. The apparatus of claim 2, wherein the mode module receives a proximity input indicator signal in response to the mode detector detecting a detachable keyboard being one of coupled to the information handling device and uncoupled from the information handling device.

4. The apparatus of claim 3, wherein the proximity input indicator signal comprises a docked mode signal in response to the information handling device being coupled to the detachable keyboard and a handheld mode signal in response to the information handling device being uncoupled from the detachable keyboard.

5. The apparatus of claim 1, wherein the input module further comprises a sensor module that receives a proximity input indicator signal from a sensor operably coupled to the information handling device.

6. The apparatus of claim 5, wherein the sensor comprises one of a three-dimensional ("3D") camera, an infrared camera, and a proximity sensor.

7. The apparatus of claim 1, wherein the settings module further comprises a display module that adjusts a resolution of the display according to the determined proximity.

8. The apparatus of claim 1, wherein the settings module further comprises a text module that adjusts the size of text presented on the display according to the determined proximity.

9. The apparatus of claim 8, wherein the text module adjusts the size of text presented on the display without adjusting the size of other items presented on the display.

10. The apparatus of claim 1, further comprising a timing module that, in response to the determined proximity, starts a timer set for a predetermined period of time, wherein the settings module adjusts the one or more display settings in response to expiration of the timer.

11. The apparatus of claim 1, further comprising a configuration module that sets one or more parameters associated with the display settings in response to user input.

12. A method comprising:
receiving a proximity input indicator signal associated with an information handling device in response to detecting that a usage mode of the information handling device changes between a laptop mode and a tablet mode, the information handling device comprising a display;
determining, by use of a processor, a proximity of a user to the information handling device in response to the received proximity input indicator signal; and
modifying one or more display settings of the information handling device based on the determined proximity.

13. The method of claim 12, further comprising receiving a proximity input indicator signal from a mode detector, the mode detector determining a usage mode of the information handing device.

14. The method of claim 13, wherein the proximity input indicator signal is received in response to the mode detector detecting a detachable keyboard being one of coupled to the information handling device and uncoupled from the information handling device.

15. The method of claim 12, further comprising receiving a proximity input indicator signal from a sensor operably coupled to the information handling device.

16. The method of claim 12, further comprising adjusting a resolution of the display according to the determined proximity.

17. The method of claim 12, further comprising adjusting the size of text presented on the display according to the determined proximity.

18. The method of claim 17, wherein the size of text presented on the display is adjusted without adjusting the size of other items presented on the display.

19. The method of claim 12, further comprising starting a timer set for a predetermined period of time in response to the determined proximity, wherein the one or more display settings are adjusted in response to expiration of the timer.

20. A program product comprising a non-transitory computer readable storage medium that stores code executable by a processor to perform:
- receiving a proximity input indicator signal associated with an information handling device in response to detecting that a usage mode of the information handling device changes between a laptop mode and a tablet mode, the information handling device comprising a display;
- determining a proximity of a user to the information handling device in response to the received proximity input indicator signal; and
- modifying one or more display settings of the information handling device based on the determined proximity.

* * * * *